March 1, 1932.
E. A. CHARLES
1,847,597
TREATMENT OF CRUDE PYROLIGNEOUS ACID
Filed April 21, 1927
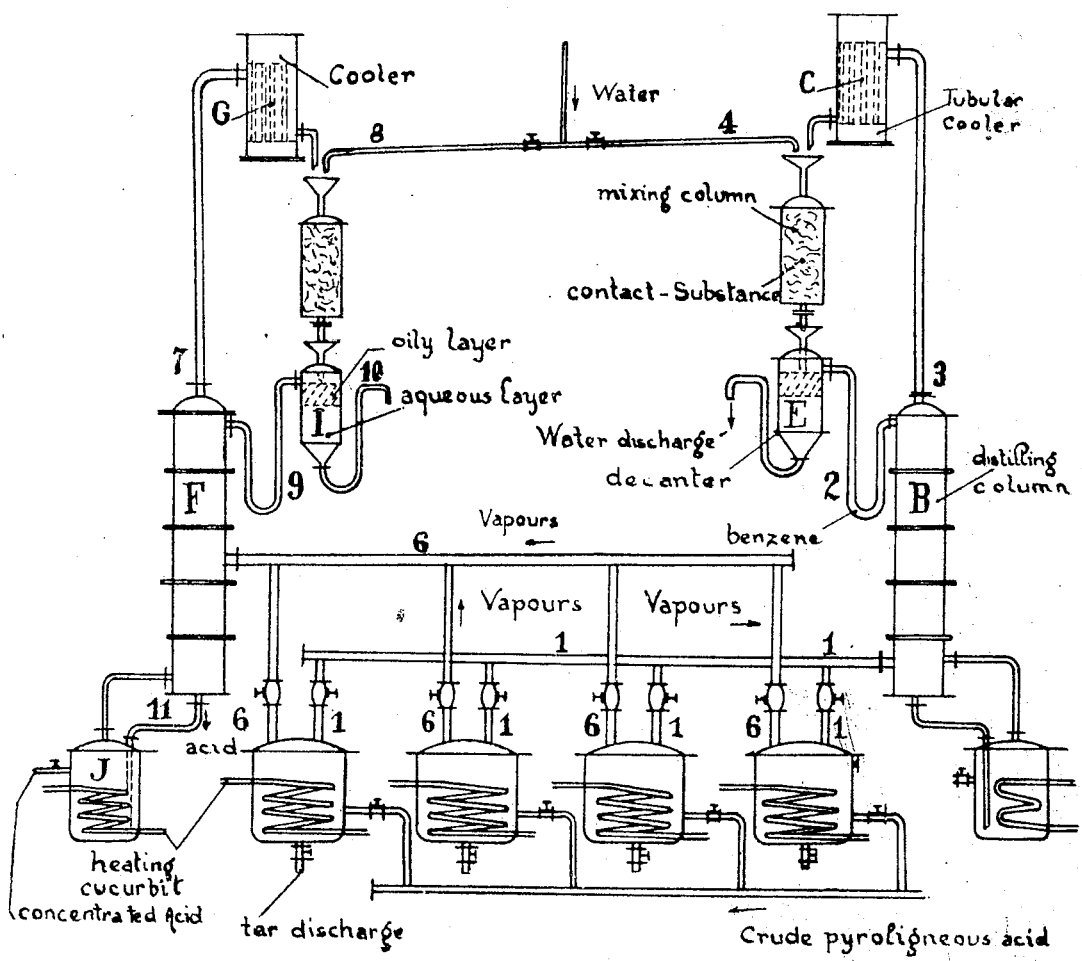
INVENTOR
ERNEST A. CHARLES
BY
Emil Dauwlyhe
ATTORNEY Patented Mar. 1, 1932

1,847,597

UNITED STATES PATENT OFFICE

ERNEST ANDRÉ CHARLES, OF CLAMECY, FRANCE, ASSIGNOR TO LA SOCIETE ANONYME DES PRODUITS CHIMIQUES DE CLAMECY (NIEVRE), OF CLAMECY (NIEVRE), FRANCE

TREATMENT OF CRUDE PYROLIGNEOUS ACID

Application filed April 21, 1927, Serial No. 185,628, and in France April 22, 1926.

The liquid product resulting from the distillation of wood in a closed vessel comprises four main constitutents which are: neutral products, acid products, tarry products and water. This liquid is called crude pyroligneous acid.

The standard treatment of crude pyroligneous acid is based on the following principle: the acid, after having been more or less rid of gum by any mechanical means, is heated in a still, unless directly treated on issuing from the tar remover; in any and all cases, the vapors are passed through an alkaline lye (milk of lime, aqueous solution of carbonate of soda, etc.) wherein all the acid products (acetic acid and its homologues) are fixed, while the neutral products (methyl acetate, acetone, methyl alcohol, allyl alcohol, various oils, etc.) are condensed in a cooler located next to the apparatus containing the alkaline lye.

In consequence, there are obtained, at the end of the operation, three products, viz:

1. Phlegms or magmas containing acetone, methyl acetate, allyl alcohol and impurities boiling up to 250° C., the presence of which is due to an entrainment by steam produced by the distillation of the pyroligneous acid;

2. An aqueous solution of a metallic acetate;

3. Residual tar, more or less acid.

The phlegms or magmas are discontinuously or continuously concentrated for the purpose of obtaining the various grades of methyl alcohol, and it is observed that the more impurities the phlegms contain, the more difficult it becomes to obtain a high proportion of wood or methyl alcohol relative to the total wood alcohol.

The metallic acetate solution has to be concentrated by evaporation and, in the case of an amorphous acetate, has to be dried at a suitable temperature. The acetate obtained is ultimately decomposed by a mineral acid if the manufacture of concentrated acetic acid is contemplated.

The object of this invention is to provide a process that will permit, through simple distillation in the presence of various bodies, the separation of:

1. Phlegms containing acetone and methyl acetate besides methyl alcohol;
2. Pyrogenated impurities containing, especially, allyl alcohol.
3. Acetic acid and homologues thereof, highly concentrated.

It is well known that certain substances, such as benzene, have the property of forming, with methyl alcohol, a binary product having a minimum boiling point, which property is utilized in the present process to separate the methyl alcohol from its impurities; such product being a mixture which yields methyl alcohol benzene, aliphatic hydrocarbons, chlorureted or not, certain light petroleum fractions and carbon bisulfide. In the case of benzene, for example, the mixture or product will boil at about 58° C. and contains in weight about 39% of methyl alcohol. Starting from the above observation, the process may be carried out in the following manner:

In a battery of stills A (see the single figure of the accompanying drawing), the pyroligneous acid is heated. The vapors evolved comprising a mixture having substantially the following composition:

Methyl alcohol _____ 20% approximately
Methyl acetate _____ 4% approximately
Acetone _____ 2% approximately
Acetic acid _____ 5% approximately
Oil _____ 2% approximately
Water _____ 67% approximately pass through piping 1 into a column B where they meet benzene led in through pipe 2 from decanter E. The object of adding the benzine in the column B is to carry away the products which have boiling points beyond a certain temperature, such as the oils, the acetic acid and the water. The vapors from the binary mixture thus formed are delivered to a cooler C through pipe 3, the condensed distillate from cooler C being discharged into a small column D where it meets water supplied by pipe 4. The heterogeneous mixture resulting from this treatment is decanted at E, the benzene returning through pipe 2 to column B and the methyl alcohol phlegms discharging at 5. The water supplied by pipe 4 is so adjusted that the specific gravity of the phlegms will range from 10° to 20° Gay-Lussac, the concentration required for proper ulterior separation of methyl alcohol, methyl acetate and acetone. These phlegms or magmas are substantially neutral.

When all the methyl alcohol has been driven off from the pyroligneous acid, it will be noted that the temperature of the vapors from the stills A reaches 69° C., after which the benzene starts to distill off. The benzene which returns to the column B is mixed at the head of the column with methyl alcohol, methyl acetate and acetone. The great quantity of vapors which are emitted by A and which contain large amounts of water prevent the benzene from descending to the bottom of the column B and consequently into A. The first part of the treatment, that is to say removal of alcohol, is completed. The pipes 1 are then closed and the pipes 6 opened, and distillation is recommenced.

The vapors then coming from stills A are led through the piping 6 into column F whence they are led into cooler G through pipe 7; the condensed distillate ultimately passing into a small column H and then collecting in decanter I. When the vapors are at 98°–100° C., substantially nothing but more or less acid water passes, while most of the pyrogenated impurities (i. e., the wood oils, the most volatile and most readily distilled, are carried away at between 70° and 97° C. There is found in the decanter I a product constituted by two layers; a light oily layer and an aqueous layer having a low acetic acid content as compared with that of the pyroligneous acid under treatment. Moreover, if the impurities (the oily layer) are washed with water supplied by pipe 8, certain constituents, and especially allyl alcohol, pass into solution.

It is upon these observations that I base the second and the third parts of my process, since it will be readily understood that if the pyrogenated impurities carry away the water without carrying away appreciable quantities of acid, such impurities will only have to be brought back constantly into column F, through pipe 9, from the decanter I in order to cause a continuous removal of water which will drain off through pipe 10 and a reflux of acid which concentrates at the bottom of the column.

By treating said impurities with water supplied by pipe 8, phlegms are obtained which may be termed crude allyl alcohol and from which pure allyl alcohol can be extracted in any suitable way. In the course of this distillation, other impurities, less volatile and less easily carried away, become mixed with the first impurities by decantation at I.

In order that the acetic acid obtained may be rid of tar, it is sufficient to cause the concentrated acid to be led to a still J through pipe 11. From this still the acid is either extracted as it stands, or it is rectified by leading the vapors into a column suitable for obtaining the desired grade. Finally, the exhausted tar is drained from the stills A.

The process can be rendered continuous if care is taken to connect, as indicated by the figure, columns B and F to a group of stills analogous to A in staggered order.

By using any of the known methods the heat produced in the course of the various operations can be utilized to its fullest extent.

I claim as my invention:—

1. In a process of treating pyroligneous acid, the steps of distilling the crude pyroligneous acid; and adding benzene to the more volatile vapors resulting from the distillation; the resulting product containing methyl alcohol, methyl acetate and acetone and having a minimum boiling point.

2. In a process of treating pyroligneous acid, the steps of heating crude pyroligneous acid; mixing the initial vapors therefrom with benzene; cooling the binary mixture thereby formed; adding water to the cooled product; decanting the resultant mixture; and mixing with fresh acid vapors the benzene recovered by the decanting.

3. In a process of treating pyroligneous acid, the steps of heating crude pyroligneous acid; mixing the initial vapors therefrom with benzene; condensing the vapors; adding water to the condensate to form a heterogeneous mixture containing methyl alcohol phlegms and benzene; decanting the last-named mixture; and mixing with fresh acid vapors the benzene recovered by the decanting.

4. In a process of treating pyroligneous acid, the steps of distilling crude pyroligneous acid until all the methyl alcohol contained therein has been driven off; heating the residue from the distillation; cooling the vapors from the distillation of the acid and thereby obtaining a condensate and water; decanting the condensate; and draining off the water.

5. A process according to claim 4, in which the cooled condensate is mixed with water prior to being decanted.

In testimony whereof I affix my signature.

ERNEST ANDRÉ CHARLES.